United States Patent
Ramkumar et al.

(10) Patent No.: US 11,468,513 B2
(45) Date of Patent: Oct. 11, 2022

(54) PORTFOLIO DECUMULATION AND RISK MANAGEMENT

(71) Applicant: BlackRock Financial Management, Inc., New York, NY (US)

(72) Inventors: Sunder Rajan Ramkumar, San Francisco, CA (US); Michael John Fredericks, New Canaan, CT (US); Michael Olegovich Pensky, New York, NY (US)

(73) Assignee: BLACKROCK FINANCIAL MANAGEMENT, INC., New York, NY (US)

( * ) Notice: Subject to any disclaimer, the term of this patent is extended or adjusted under 35 U.S.C. 154(b) by 0 days.

(21) Appl. No.: 14/181,620

(22) Filed: Feb. 14, 2014

(65) Prior Publication Data
US 2014/0229403 A1    Aug. 14, 2014

Related U.S. Application Data

(60) Provisional application No. 61/764,994, filed on Feb. 14, 2013.

(51) Int. Cl.
*G06Q 40/00* (2012.01)
*G06Q 40/06* (2012.01)

(52) U.S. Cl.
CPC ................... *G06Q 40/06* (2013.01)

(58) Field of Classification Search
CPC ........ G06Q 99/00; G06Q 40/00; G07D 11/00; G06K 5/00
See application file for complete search history.

(56) References Cited

U.S. PATENT DOCUMENTS

| | | | |
|---|---|---|---|
| 7,912,774 B2 * | 3/2011 | Cooper | G06Q 20/40 705/35 |
| 7,962,384 B2 * | 6/2011 | Arena | G06Q 40/04 705/35 |
| 8,099,350 B2 * | 1/2012 | Ryder | G06Q 40/06 705/36 R |

(Continued)

OTHER PUBLICATIONS

PCT International Search Report and Written Opinion for PCT/US2014/016629, dated May 19, 2014, 15 Pages.

*Primary Examiner* — Olabode Akintola
(74) *Attorney, Agent, or Firm* — Haynes and Boone, LLP

(57) ABSTRACT

A decumulation management system provides guidance for decumulation of a portfolio over a decumulation period of time. A spending amount is withdrawn from the portfolio during the decumulation period of time. The decumulation management system determines the probability of successfully withdrawing the spending amount during the remaining decumulation period and establishes thresholds for adjusting the spending amount and a risk profile of the portfolio based on the performance of the portfolio during the decumulation. When the portfolio value decreases below the thresholds, the spending amount may be reduced, and when the portfolio value exceeds the thresholds, the spending amount may be increased and the risk profile of the portfolio is decreased. The decumulation management system may provide recommendations based on these thresholds, or may automatically manage withdrawals of the spending amount and investments to match the risk profile.

20 Claims, 16 Drawing Sheets

(56) References Cited

U.S. PATENT DOCUMENTS

| | | | | |
|---|---|---|---|---|
| 2007/0244806 A1* | 10/2007 | Klingele | ............... | G06Q 40/04 |
| | | | | 705/38 |
| 2008/0249957 A1* | 10/2008 | Masuyama | ............ | G06Q 40/06 |
| | | | | 705/36 R |
| 2009/0138406 A1* | 5/2009 | Reinkemeyer | ......... | G06Q 40/06 |
| | | | | 705/36 R |
| 2011/0251978 A1* | 10/2011 | Davies | ................... | G06Q 40/00 |
| | | | | 705/36 R |
| 2011/0295731 A1* | 12/2011 | Waldron, III | ...... | G06Q 10/0635 |
| | | | | 705/35 |
| 2015/0066811 A1* | 3/2015 | Legare | ................... | G06Q 40/06 |
| | | | | 705/36 R |

* cited by examiner

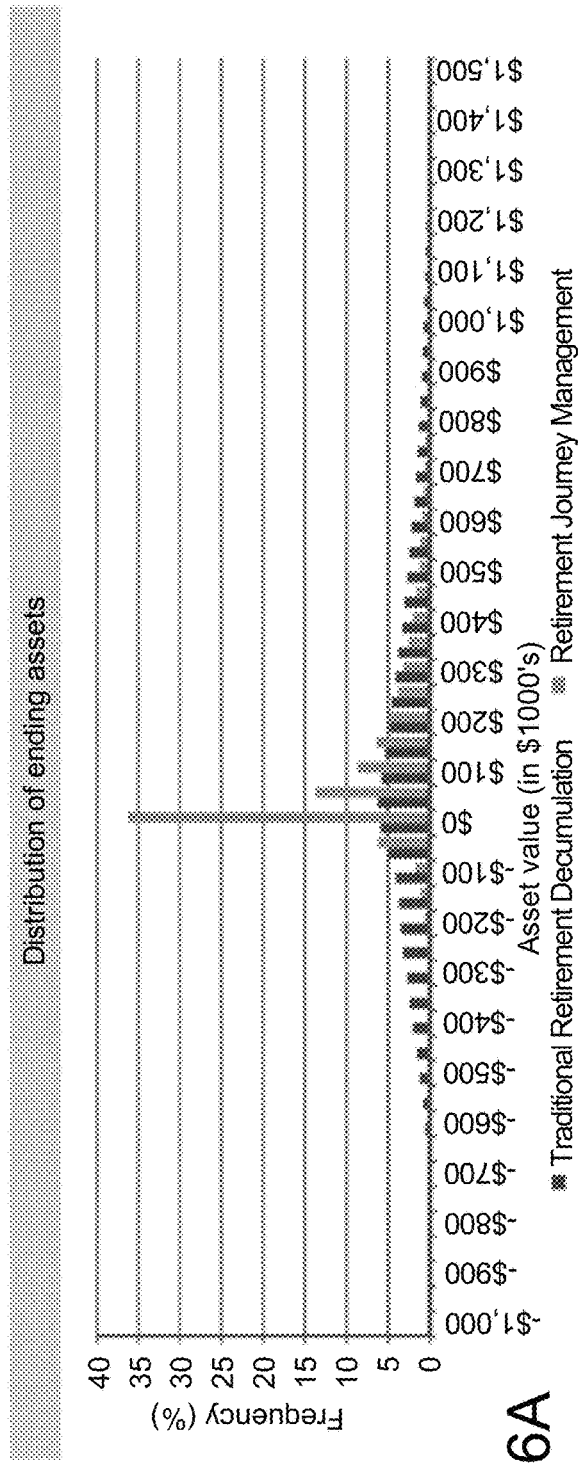
Fig. 6A
Fig. 6B
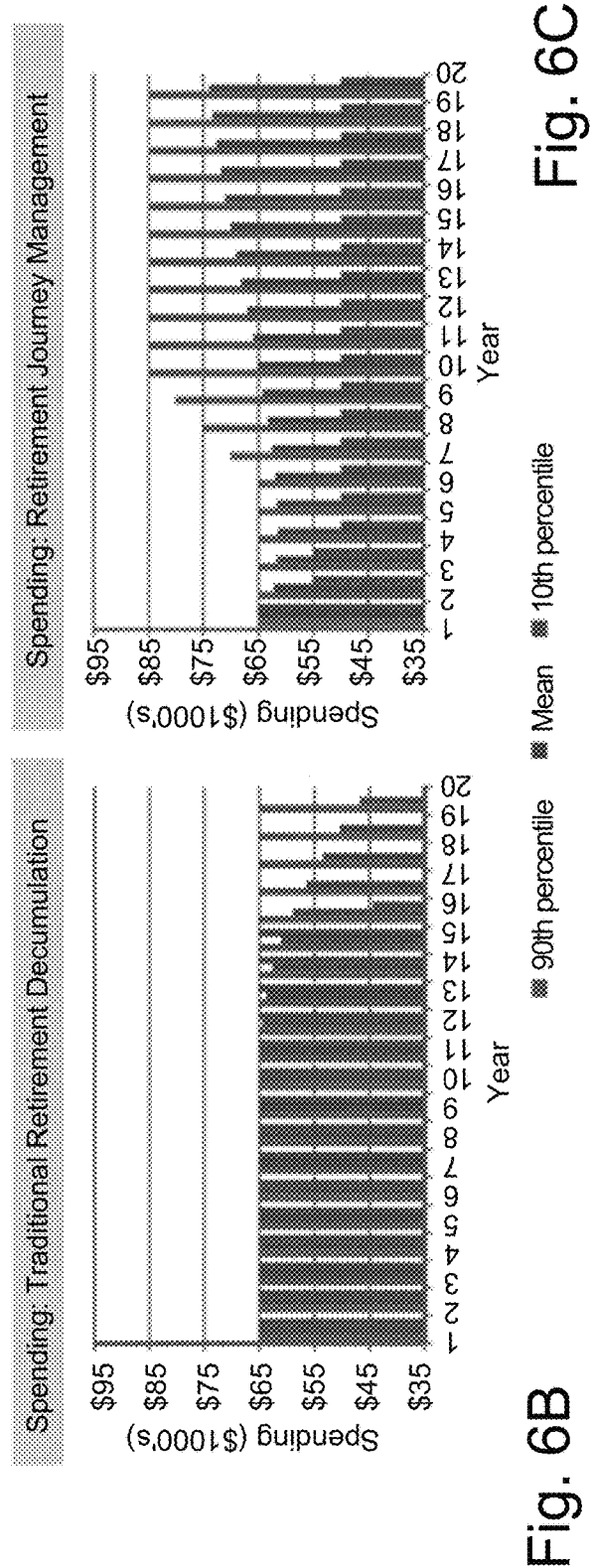
Fig. 6C

PORTFOLIO DECUMULATION AND RISK MANAGEMENT

CROSS REFERENCE TO RELATED APPLICATIONS

This application claims the benefit of U.S. Provisional Application No. 61/764,994, filed Feb. 14, 2013, which is incorporated by reference in its entirety.

BACKGROUND

This invention relates generally to asset drawdown ("decumulation") of a portfolio, and more particularly to retirement spending planning.

Asset drawdown scenarios, such as spending during retirement, initiate periodic asset withdrawals from an account over a desired amount of time. Typical asset drawdown strategies recommend withdrawing a specific amount of assets from the account every year. For example, an advisor may suggest withdrawing a specific percentage of the original assets every year, such as 6.5% of the original value, with a target of depleting the account after 20 years. This withdrawal strategy has a significant risk of depleting assets early. In particular, since assets are typically invested with some amount of estimated risk, this strategy fails to account for changes to actual account value of investment assets over time.

SUMMARY

An asset decumulation strategy is based on actual asset performance during the desired decumulation period and adjusts withdrawal amounts and the portfolio's risk profile accordingly. Tiered spending levels are established and selected based on actual asset performance during the decumulation period. When assets perform well, spending levels are maintained and may be increased to the next spending tier. When assets perform poorly, spending is reduced to a lower spending tier. Similarly, tiered risk levels are established. An investor is mapped into an appropriate risk level based on his objectives. If the assets perform well, the risk profile is decreased to lower tiers. This helps lock in gains and provides increased certainty of meeting the spending objective. Conversely, if the assets perform poorly, the asset risk profile is maintained as the investor needs to maintain high expected returns to achieve spending objectives.

The asset decumulation strategy is calculated by a decumulation management system, which performs simulations to determine the likelihood of successfully decumulating assets during the desired decumulation period and generates the strategy based on these determinations. The decumulation management system may provide recommendations to a user based on the likelihoods, or may automatically manage assets to control spending levels and investment of the portfolio in assets matching the asset risk profile.

BRIEF DESCRIPTION OF THE DRAWINGS

FIGS. 4A-4J show additional example user interfaces for interacting with an decumulation management system.

FIG. 6A-6C compare a constant-spending decumulation approach with one embodiment of decumulation using a decumulation management system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In recent years, as more and more baby boomers enter into retirement, there has been an increasing demand for retirement income solutions. This disclosure describes an approach to retirement decumulation, or "Journey Management," and how it can lead to improved outcomes for retirees. This disclosure focuses on a retiree drawing down a portfolio during retirement, but the same approach applies to any investor seeking to spend assets down over a specific period of time. For convenience, an example scenario is used for a 65-year-old retiree expecting a 20-year retirement while withdrawing from a $1 million portfolio and desiring substantially consistent year-to-year spending from the portfolio.

In one embodiment, the asset decumulation approach selects from among spending levels and/or risk levels for the portfolio. The spending level and risk level at any given time are selected from spending and risk bands based on the portfolio value and the amount of time remaining for decumulation. The spending and risk levels are adjusted to maintain a high probability of successfully decumulating assets from the portfolio without prematurely exhausting the assets. Risk bands illustrate varying levels of portfolio volatility and represent multi-asset portfolios with corresponding volatility levels. The spending bands are generated based on tiered spending levels, which may be defined as a percentage of the initial portfolio or by specific spending amounts desired by the account holder. For example, in the $1M portfolio, the account holder may prefer to withdraw 6.5% of the account, or $65,000 each year, but be willing to withdraw as little as 4.5% or $45,000 in spending to preserve assets or as high as 8.5% or $85,000. Each half-percent between the high and low amounts is treated as a spending level in this example. The initial spending level may be provided by the account holder, or the initial level may be suggested based on the portfolio value and risk profile of the account. A minimum spending rate may be suggested, such as a floor of 2% of the initial spending rate. A spending rate maximum may or may not be suggested. Though these examples use an equal number of spending tiers above and below the preferred spending amount, there may be an unequal number of spending tiers on either side of the preferred spending amount.

Figure 1:
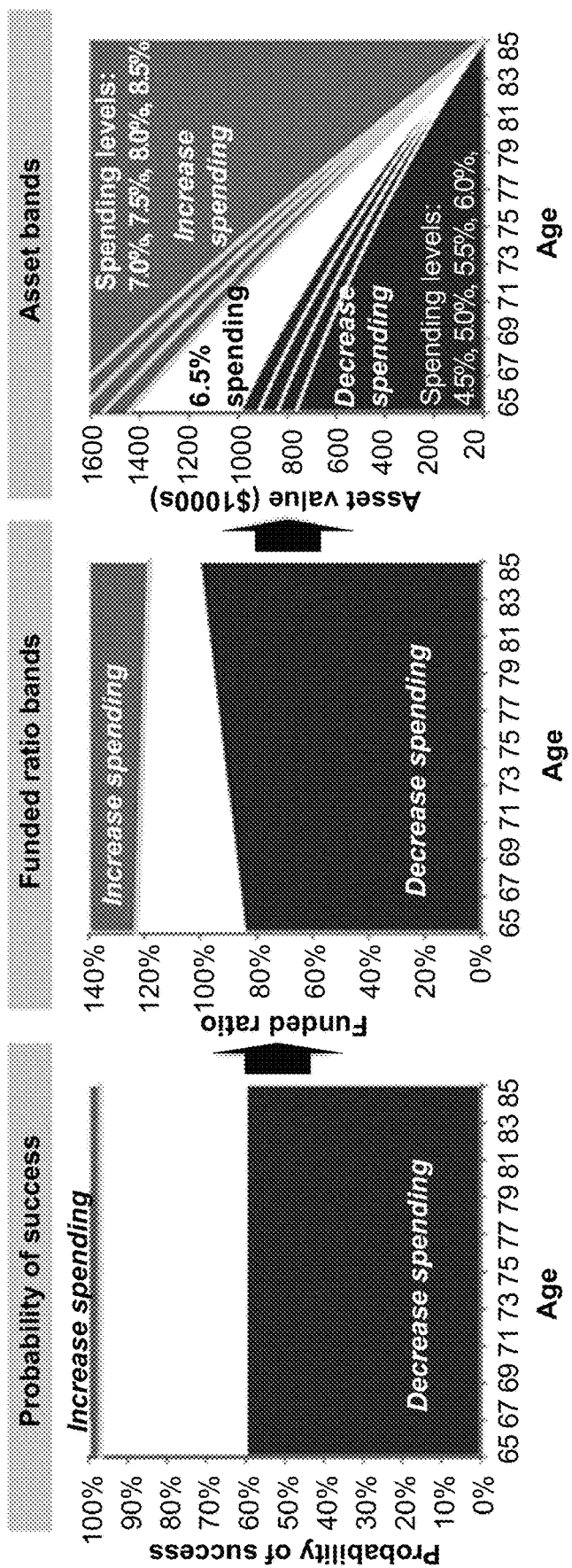
FIG. 1 illustrates spending bands generated according to one embodiment.

FIG. 1 illustrates how spending bands may be generated according to one embodiment. The spending bands are generated by calculating probabilities of success (i.e., decumulation without premature asset exhaustion) for that spending level at various portfolio values and at the current risk level over time. The calculation of success probability is performed in one embodiment by maintaining the applicable spending level through the decumulation period, assuming static allocations and spending for conservatism and computational ease. Based on the probability of success, thresholds are selected to increase or decrease spending to the next spending level. Specifically, as illustrated in the first panel, one embodiment uses a 60% probability threshold for payout reduction and a 97% probability threshold for payout increases. These thresholds provide a balance between a high payout and achieving a high probability of success assuming a dynamic process. Other embodiments may select a lower or higher threshold for decreasing spending or increasing spending consistent with preserving assets through the decumulation period.

In one embodiment, minimum funded ratios are calculated that correspond to the probability of success thresholds at various time horizons. The funded ratio measures the ratio of assets to liability desired for each spending level, where the liability measures the present value of future desired spending. In one embodiment, iterative Monte-Carlo simulations are used to perform the minimum funded ratio calculations. These simulations are based on expectations of long-term risk and return associated with the investment portfolios. This is illustrated in the second panel of FIG. 1. For example, in order to ensure a 60% probability of success, an investor requires a funded ratio of 84% with a 20 year horizon and 99% with a 1 year horizon. Similarly, in order to ensure a 97% probability of success the investor must have funded ratios of 123% and 119% over 20 years and 1 year, respectively. Each funded ratio band is converted into an asset band (associated with a spending level) indicating whether to increase or decrease spending based on the asset level as illustrated in Panel 3 of FIG. 1. Thus, each line in the graph represents a spending level for the portfolio. As the actual asset value for the portfolio falls below or exceeds the line for each spending level, the recommended spending level is changed to correspond to the spending level of the new line. For example, an 84% funded ratio implies a minimum asset value of $994,500 when the payouts are 6.5% (i.e., present value of spending equates to $1,178,330) and a minimum asset value of $918,010 when the payouts are 6.0% (i.e., present value of spending equates to $1,087,690). Hence, the asset band in Panel 3 of 6.5% for twenty years of decumulation begins at $994,500, and the asset band of 6.0% begins at $918,010.

Investors may select portfolios that are managed either in a tax efficient or tax agnostic manner. Tax efficient portfolios would likely be held in taxable accounts and hold asset classes that tend to generate lower taxes such as municipal bonds and high dividend yielding stocks. Tax agnostic portfolios would likely be held in tax deferred or tax exempt accounts and the asset allocation would be indifferent to rates of taxation.

Figure 2:
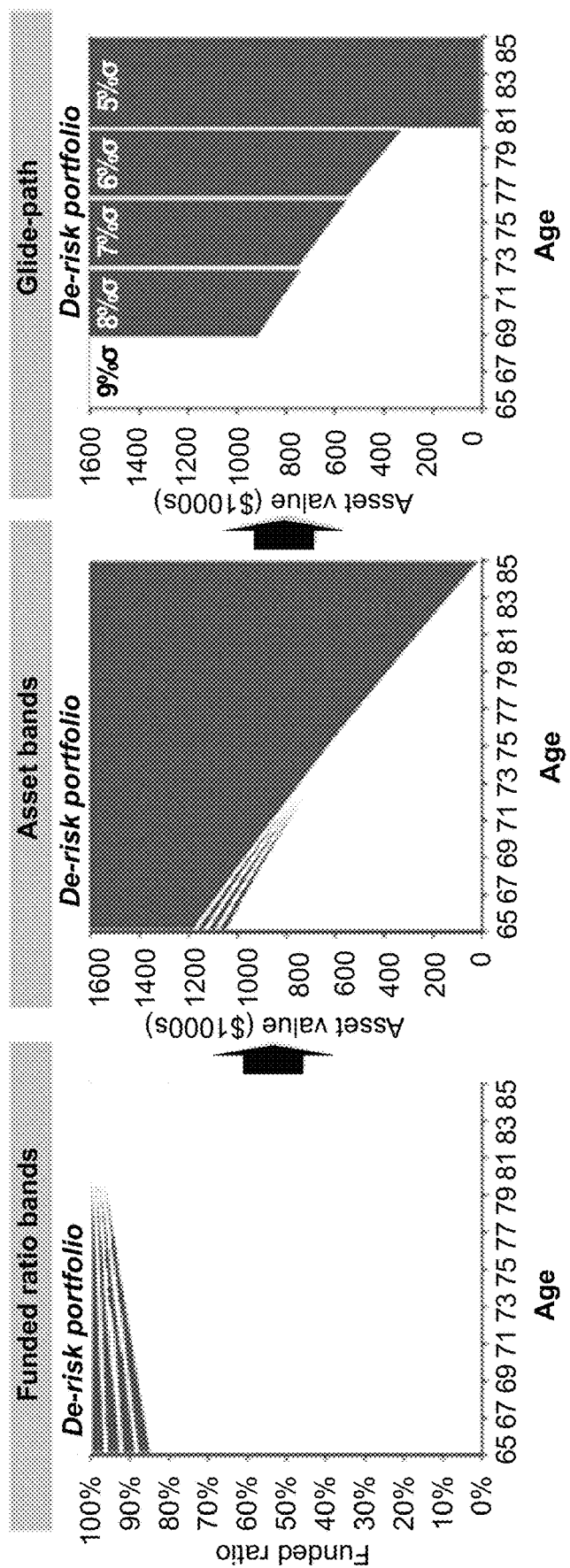
FIG. 2 shows risk bands generated for a portfolio according to one embodiment.

FIG. 2 shows risk bands generated for a portfolio according to one embodiment. After determining payout bands, risk bands are developed to determine when to adjust the risk level of the portfolio as illustrated in FIG. 2. Each risk band is associated with an investment in a basket of asset classes that targets volatility commensurate with the band and has an assumed rate of return consistent with specified forward-looking expectations. The maximum risk (10%) band corresponds to the minimum asset values where a 10% volatility portfolio can meet desired objectives with 60% confidence, assuming static allocations and spending. This is calculated using the same iterative Monte-Carlo simulation methodology used for payouts. The minimum risk (5%) band corresponds to asset values where a retiree can guarantee his desired spending and bequest objectives (funded ratio=100%). Theoretically, in this scenario, an investor could purchase very low risk (or even risk-free) assets and be assured of meeting his objectives. But in practice, most investors value upside and would prefer to take on some minimum level of risk, here set at 5%. After determining bands corresponding to minimum and maximum risk portfolios, intermediate risk bands are interpolated between these extremes such that retirees move through lower risk levels gradually as the probability of success increases. In this embodiment, when it comes to asset allocation decisions, lower risk portfolios are selected if the asset values in lower risk portfolios are sufficient to maintain desired spending (i.e., above the asset values that correspond to the lower risk zone).

Through time, if the investor's assets fall into one of the lower spending zones, he would be prompted to implement corresponding spending cuts. However, in one embodiment of the risk management approach, a portfolio only gradually moves into lower risk portfolios through time if the asset values remain commensurate with desired spending. In effect, as illustrated in the third panel of FIG. 2, the glide-path specifies minimum risk allocations which decline linearly from the starting portfolio to the minimum risk portfolio at age 80. This helps preserve upside potential and prevent scenarios where one or two years of good performance would move the investor to the minimum risk portfolio.

The bands for spending and asset allocation changes depend on the investor's specified objectives and circumstances. Different income, bequest, inflation, and decumulation periods as well as factors such as tax status, tax rates, fees, capital market assumptions and required minimum contributions change the implied liability and therefore the required funding amounts. The assets are mapped into an initial retirement portfolio with the appropriate risk level based on the initial asset value relative to the asset bands and the algorithm recommends de-risking as asset values increase. In one embodiment, once risk is reduced, the risk is not subsequently increased, even if asset values decline. This risk "ratcheting" prevents investors from "doubling down" on risk in bad states of the world and exposing themselves to severe losses in sustained bear markets. Thus, the risk ratcheting preserves assets and reduces the likelihood spending will be reduced in the future. Furthermore, since the ability to tolerate losses likely diminishes as the portfolio approaches its final years, irrespective of portfolio outcomes, one embodiment moves assets into the most conservative portfolio risk allocation in the final few years. This asset decumulation is thus designed to be conservative and align portfolio outcomes with investor objectives while limiting the likelihood of extreme negative outcomes.

Figure 3A:
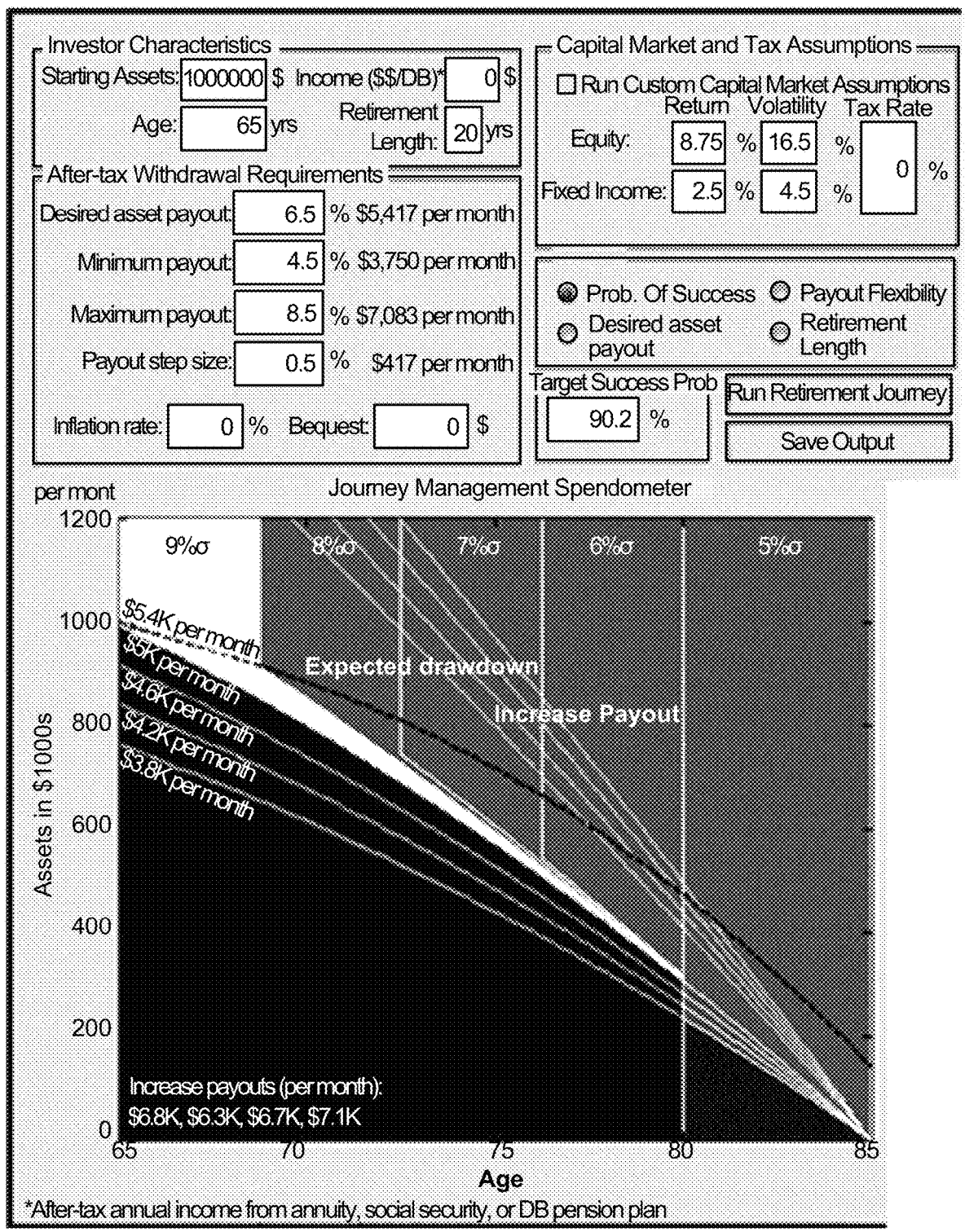
FIGS. 3A-3B illustrates a user interface for interacting with a decumulation management system according to one embodiment.
Figure 3B:
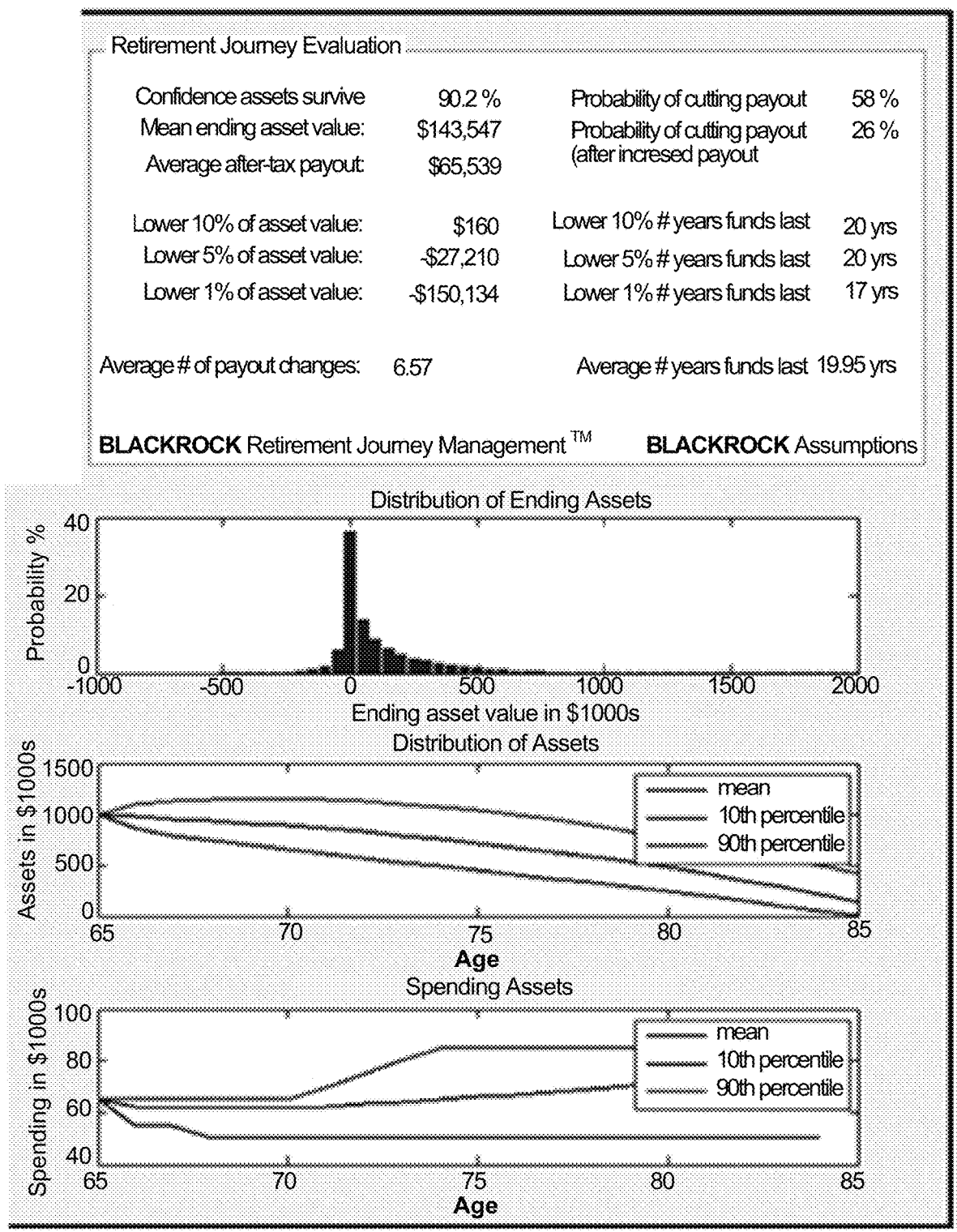

FIGS. 3A-3B illustrate a user interface for interacting with a decumulation management system according to one embodiment. The decumulation management system may provide prescriptive advice to a user, or may automatically manage retirement assets by managing portfolio assets for desired risk levels and selling assets to generate withdrawals. The "Journey Management Spendometer" illustrates the spending and risk bands displayed in a single graph. As asset values decrease, the spending recommendation is also decreased as the asset values pass each spending level line on the graph. In favorable asset value circumstances, the portfolio is de-risked, and, if conditions continue to be favorable, spending may also be increased if asset values exceed the designated spending lines. The user or financial adviser may enter various conditions for managing asset decumulation, such as the desired spending rate, spending floor, asset amounts, legacy, inflation, asset class return and volatility, and other factors including tax status, tax rates, required minimum contributions, fees and tax-agnostic or tax-efficient portfolios. These conditions are used as described above to generate the spending level asset bands and risk levels as shown. The likelihood of various distributions of ending assets and spending distributions may also be calculated and displayed.

Figure 4A:
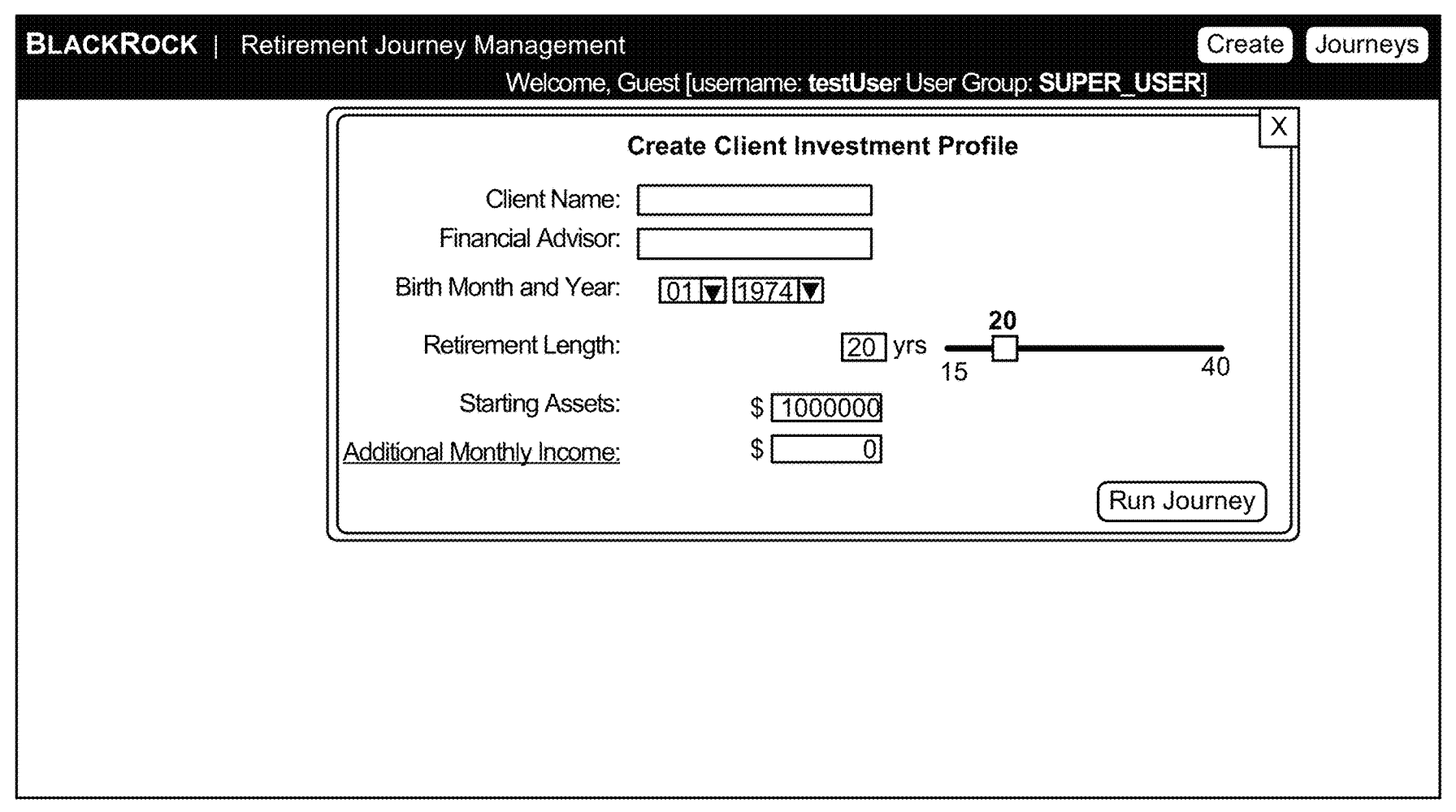
Figure 4B:
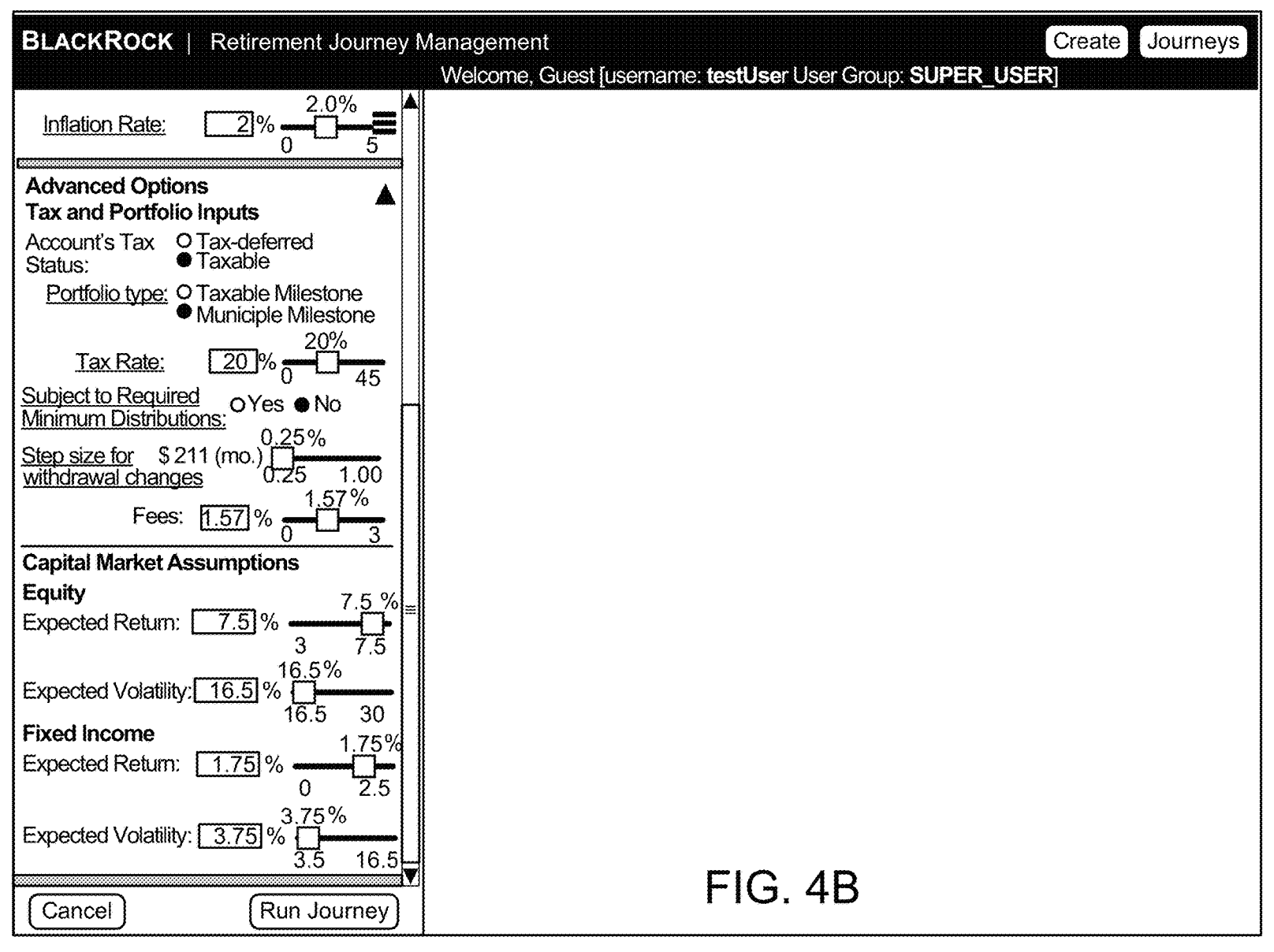
Figure 4C:
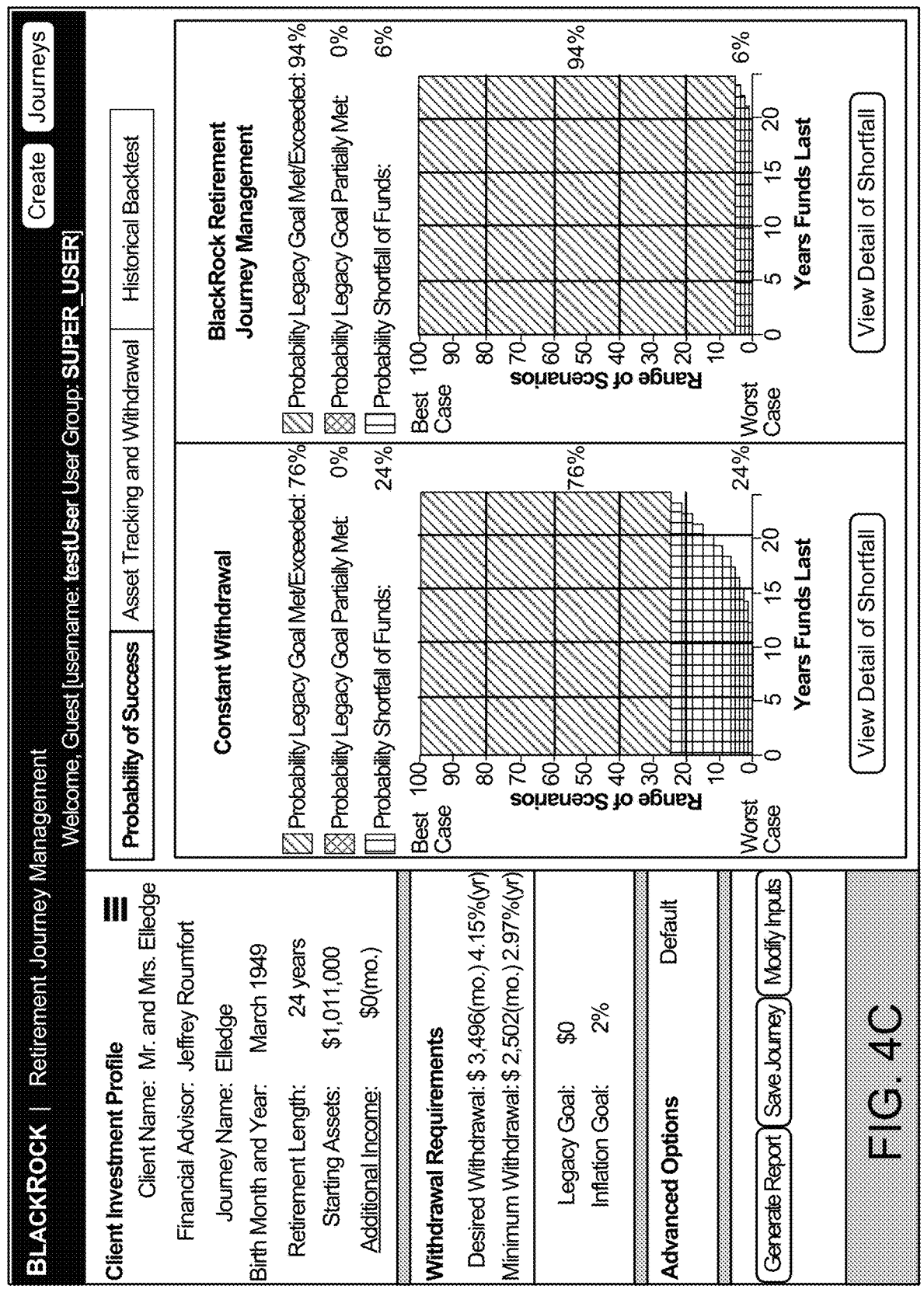

FIGS. 4A-4J show additional example user interfaces for interacting with an decumulation management system. FIG. 4A shows an interface for entering a information relating to the portfolio to be decumulated, such as the starting assets and length of decumulation, here treated as a retirement. FIG. 4B shows an interface for entering information relating to the expected performance of the portfolio, including assumptions about performance of the portfolio in various assets (e.g., equities or fixed income investments). FIG. 4C illustrates an interface to compare the likelihood of successfully completing decumulation of the portfolio without depleting assets using a constant withdrawal or using spending and risk level adjustments as described herein. As shown in FIG. 4C, in this example the desired spending level is $3,496 per month, or 4.15 percent of the starting assets of $1,011,000.

Figure 4D:
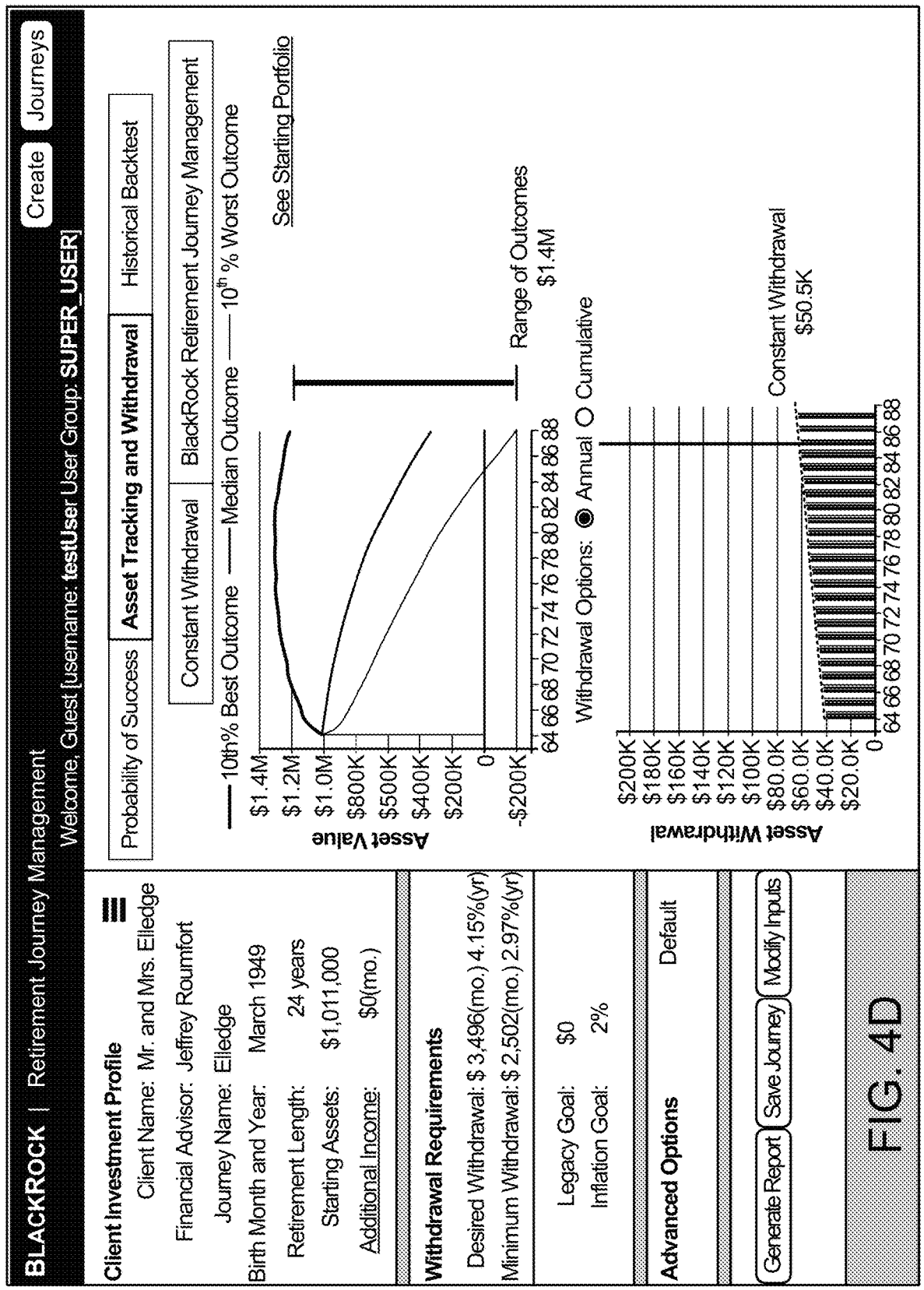
Figure 4E:
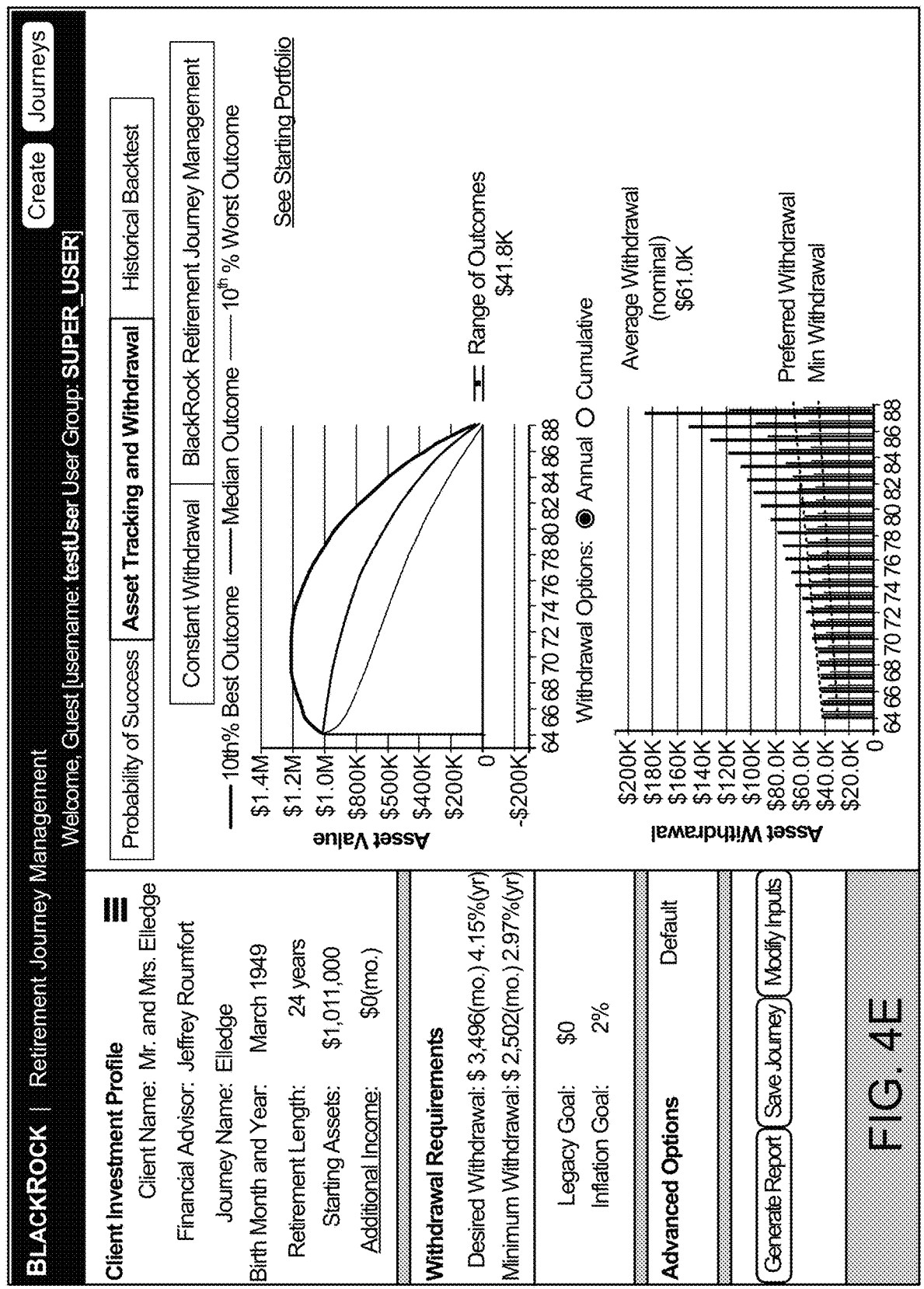

FIG. 4D is an example user interface showing a range of outcomes using a constant withdrawal amount. FIG. 4E is an example user interface showing a range of outcomes using adjustments to spending amounts and risk profiles as described herein. As shown by a comparison between FIGS. 4D and 4E, adjusting the spending amounts and risk profile dramatically increases the likelihood that the range of outcomes meets the desired goal and that assets last to the desired end of decumulation. In addition, the range of outcomes is reduced by increasing or decreasing the spending amounts accordingly.

Figure 4F:
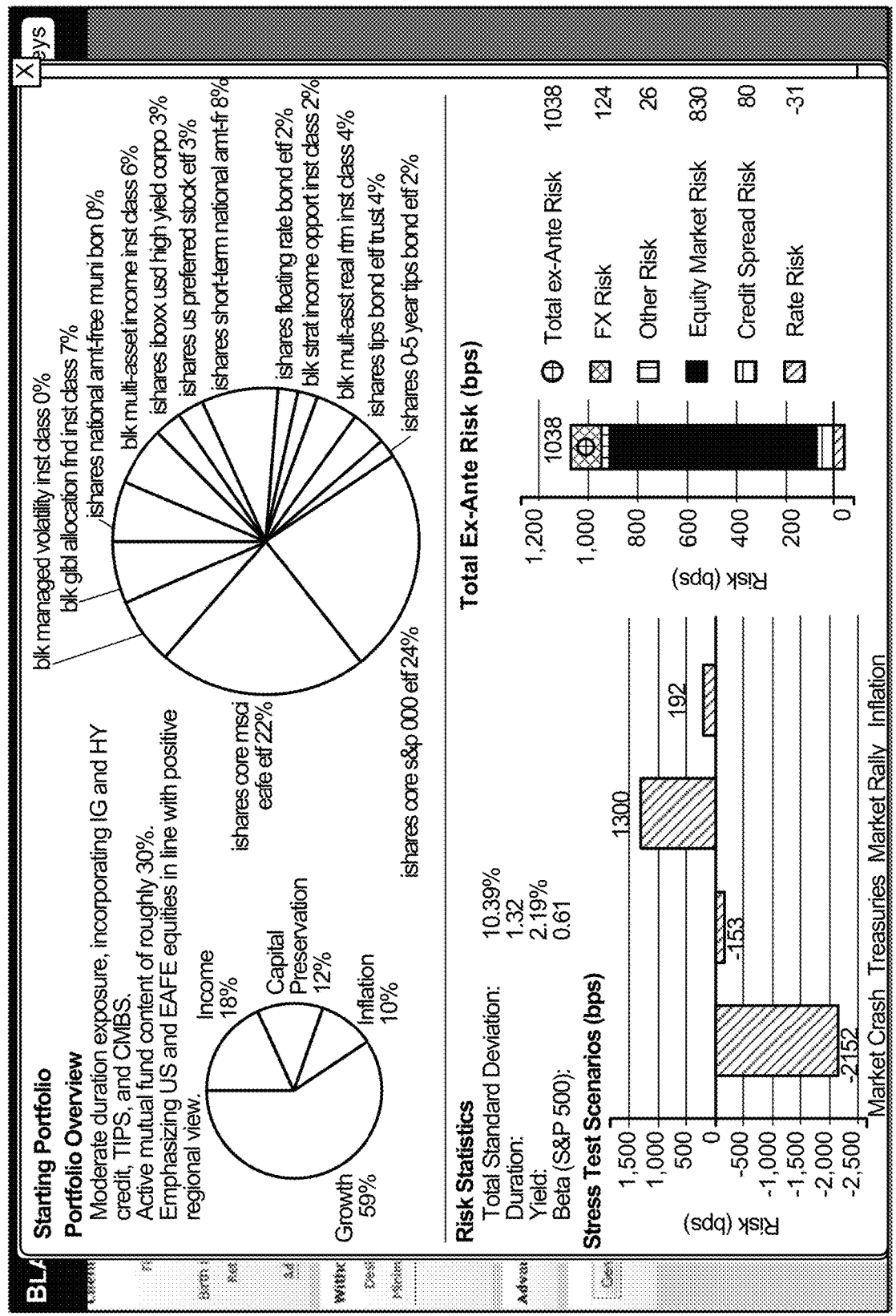
Figure 4G:
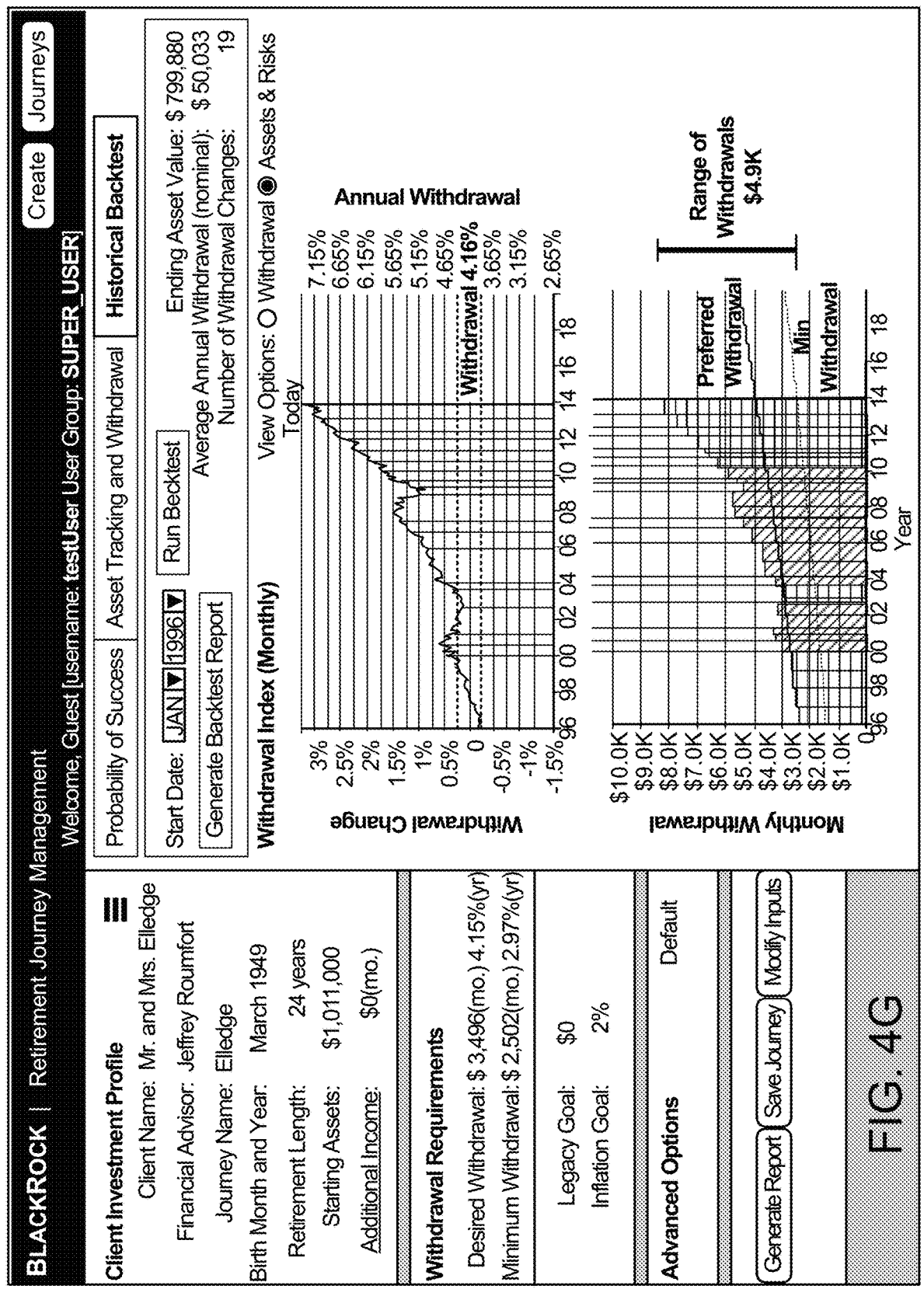
Figure 4H:
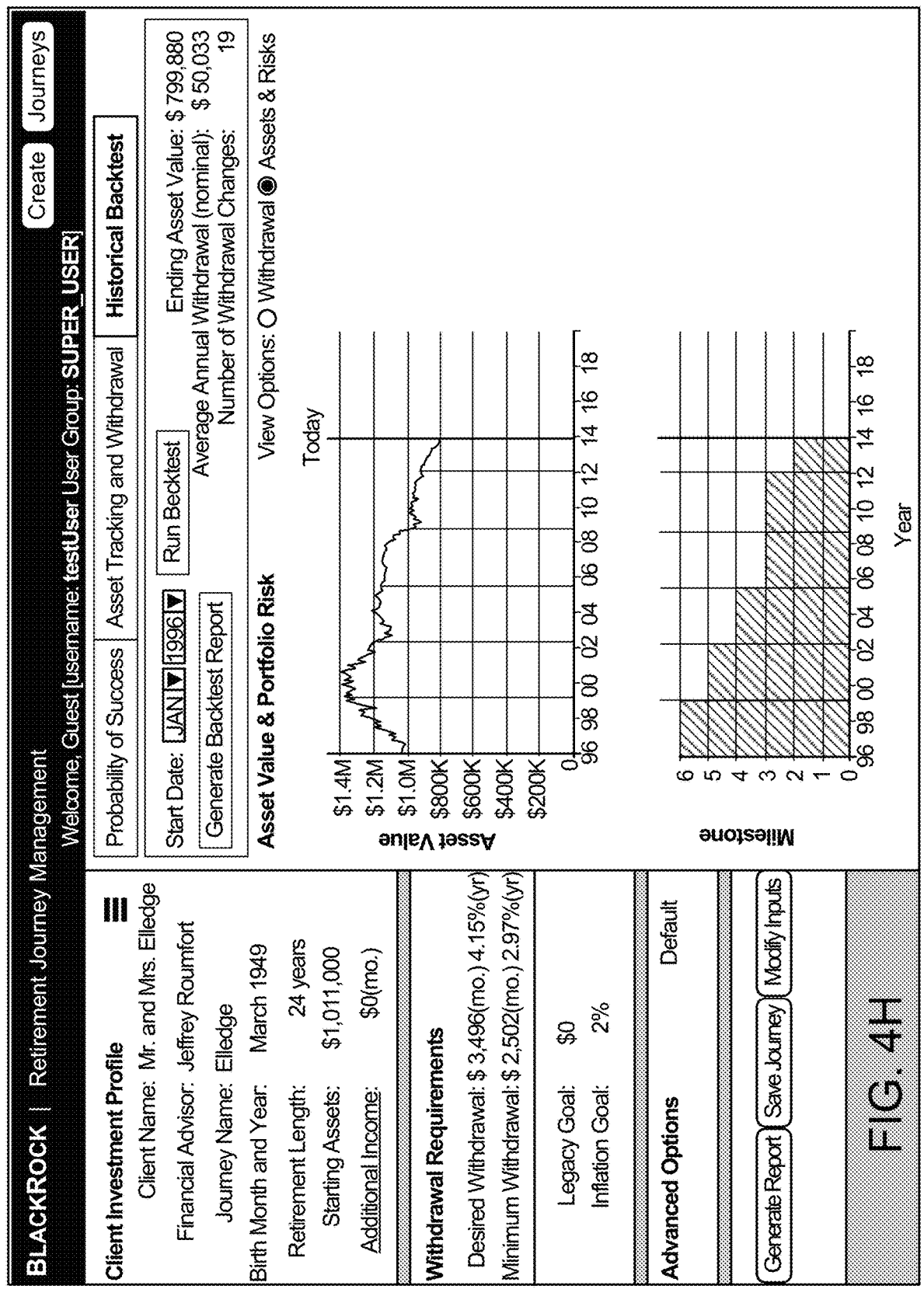
Figure 4I:
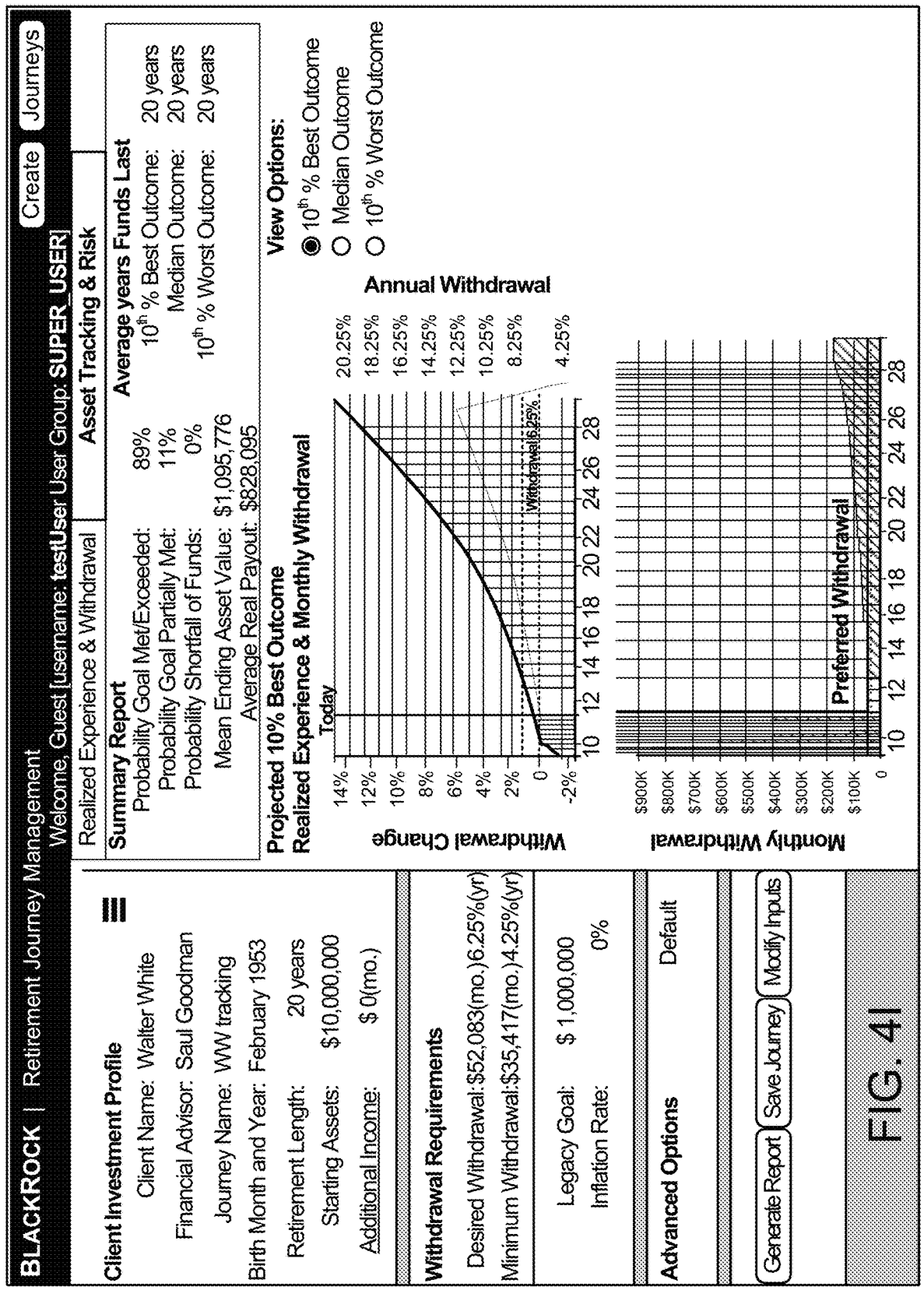
Figure 4J:
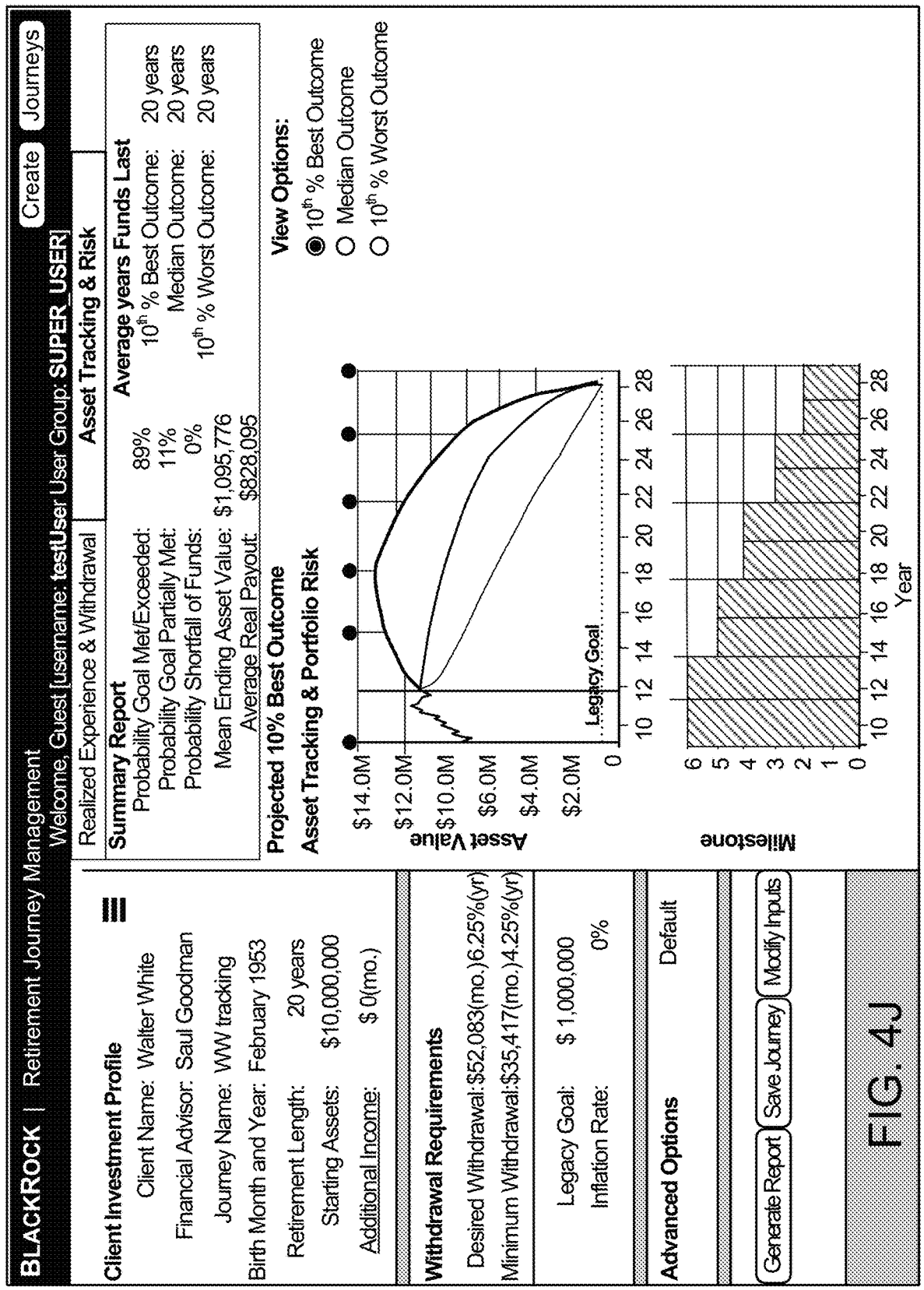

FIG. 4F illustrates an example portfolio and risk factors associated with for a risk profile. The risk factor for a portfolio may be based on various stress tests, possible yields, and so forth as shown in FIG. 4F. FIG. 4G is an example user interface showing a backtested application of the portfolio withdrawals, in this case backtesting a portfolio that began withdrawals in 1996. FIG. 4H is an example user interface showing asset and risk profiles of the portfolio using the same backtesting application. FIG. 4I shows a user interface permitting a user to query possible likely outcomes using the spending levels and risk profiles for a decumulation. In this example, the user interface displays the top $10^{th}$ percentile of outcomes. These outcomes may be based on a monte carlo simulation of applying the decumulation strategy to the portfolio. Similarly, FIG. 4J shows the projected asset values over time of the top $10^{th}$ percentile of outcomes.

Figure 5:
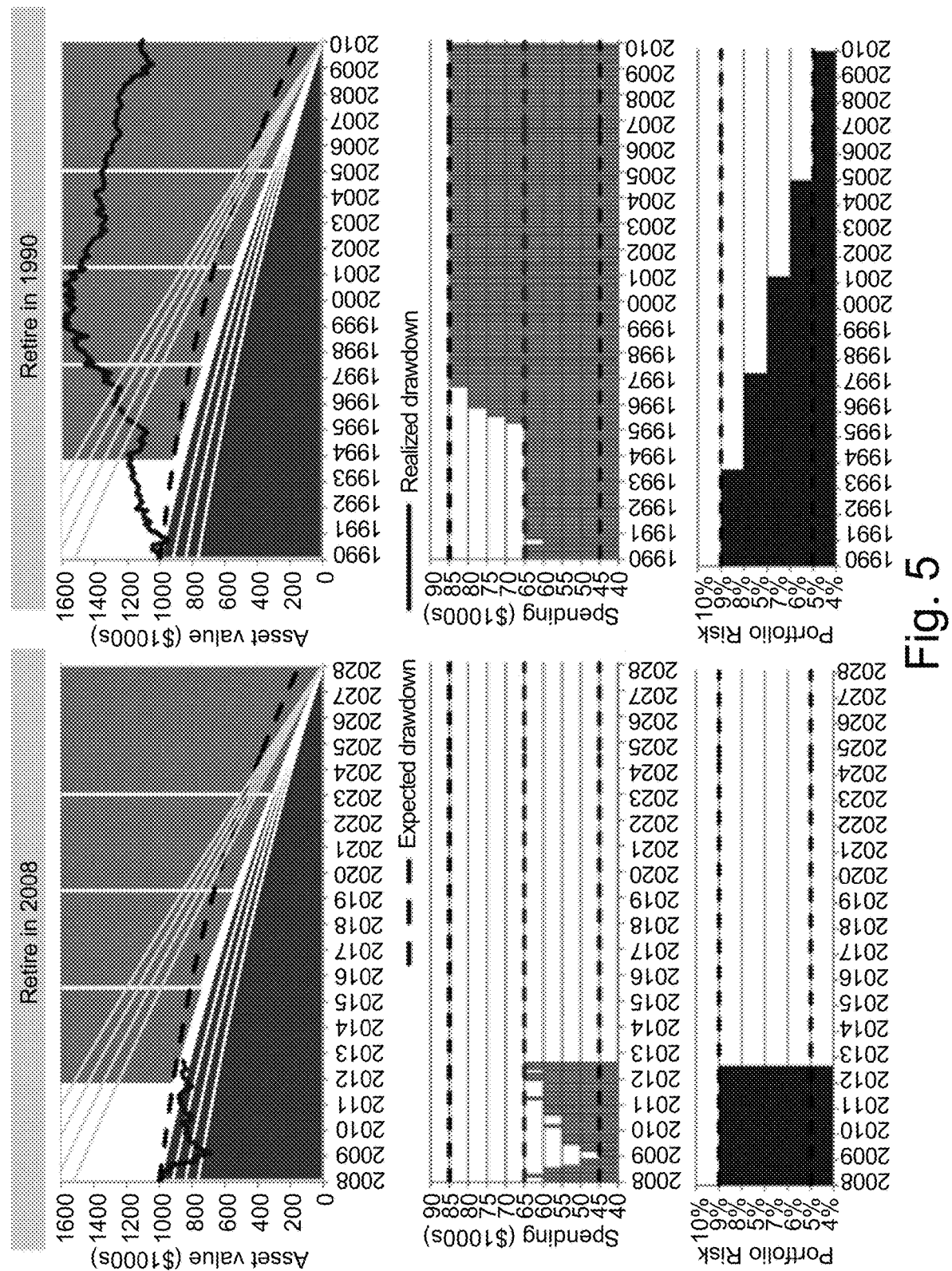
FIG. 5 shows two historical scenarios managed using asset decumulation according to one embodiment.

FIG. 5 shows two historical scenarios managed using asset decumulation according to one embodiment. FIG. 4 illustrates how this would have worked historically for two investors who sought 6.5% spending from a $1M portfolio, one beginning in 1990 and the other in 2008. Both investors would have started spending $65,000 from the same portfolio. However, the investor who began withdrawals in 2008 would have experienced a large portfolio drawdown early in the decumulation period and would have had to gradually cut spending down to the 4.5% floor level in 2009 before recovering to the target spending level in 2011 as markets improved. This investor's portfolio continues to maintain risk to achieve objectives in light of the market downturn. In contrast, the investor who started spending assets in 1990 experienced a market rally and would not only have gradually lowered the risk of his portfolio but also would have gradually increased spending to 8.5%.

FIGS. 6A-6C compare a constant-spending decumulation approach with one embodiment of decumulation using a decumulation management system. Decumulation strategies assuming a fixed asset allocation (i.e. constant risk) and a constant spending level lead to a wide distribution of investment outcomes as illustrated in FIG. 5A. For example, an investor who draws $65,000 from a $1 million portfolio for 20 years has a 32% chance of running out of money early and a 10% chance of running out of money as soon as year 15 and would need to borrow almost $300,000 to meet his income needs.

|  | Constant-Value Decumulation | Controlled-Value Decumulation |
| --- | --- | --- |
| Probability of Early Depletion | 31.5% | 9.8% |
| Average Asset Value (20 years) | $216,754 | $143,547 |
| $10^{th}$ Percentile Asset Value (20 years) | −$283,881 | $ 160 |
| Average Annual Spending | $ 61,615 | $ 66,539 |

The controlled-value decumulation approach of one embodiment dramatically reduces uncertainty by following a more dynamic, outcome-based approach to spending and asset allocation. Following an embodiment described above, FIG. 5A illustrates that building in 2% spending flexibility (specifically, spending levels of 6.5±2%) can reduce the probability of running out of money to 10% and reduce the left tail of the outcome distribution. FIGS. 5B and 5C illustrate spending profiles in traditional decumulation and managed decumulation scenarios. In particular, as shown in FIG. 5B, spending levels for the traditional decumulation frequently causes the portfolio to reduce spending due to exhaustion of the account. As shown in FIG. 5C, the average spending for the controlled decumulation alternative is improved to $67,000 and the likelihood of prematurely depleting the account is dramatically reduced. Even in the $10^{th}$-percentile worst-case simulated scenario, the portfolio supports an acceptable level of spending throughout the decumulation scenario.

These examples illustrate how a combination of customized planning and real-time monitoring can provide a holistic approach to retirement, designed to align realized outcomes with investor objectives.

In one embodiment, the techniques described above are performed by a decumulation management system. The decumulation management system includes various modules and data stores for determining funded ratios, asset bands, risk levels, and a glide path. The decumulation management system may store information regarding expected risk and related returns, and may include a system for identifying particular assets or a basket of assets for achieving a particular risk level. The decumulation management system may also store a module for performing Monte-Carlo simulations to assess possible performance of assets invested in particular funds. The decumulation management system includes a module to generate a user interface, such as those shown in FIGS. 3A-3B and 4A-4J. The decumulation management system may also be configured to manage assets by providing instructions to purchase or sell assets to provide spending amounts for a selected spending level or to allocate portfolio assets to assets corresponding to a desired risk level.

Thus, the decumulation management system provides advice that is customized to each investor and linked to a set of multi-asset portfolios that may be used to select a risk profile for the user. The tool is designed to serve two main roles. First, it helps investors develop a customized spending plan. It maps each client into an appropriate portfolio based on his specific withdrawal objectives and time horizon and creates transparent rules for how spending and asset allocation will evolve through time as a function of portfolio outcomes. Financial Advisors or individual investors can use the front-end of the tool, such as the embodiment shown in FIG. 3, to evaluate tradeoffs and potential outcomes associated with a variety of withdrawal amounts using Monte-Carlo simulations and develop a robust plan. Second, the tool is meant to help monitor each unique investor's assets and trigger suggested spending/asset allocation changes when pre-agreed thresholds are breached. The tool may monitor asset performance and generate notifications to the user or financial advisor in response to the assets crossing a spending or risk threshold. These notifications may enable the portfolio's manager to take appropriate actions in response to change in the value of the assets.

In addition, in one embodiment, a portfolio is automatically managed using the asset decumulation as described. The decumulation management system automatically sells assets from the portfolio at specified times, such as quarterly or monthly, based on the designated spending level of the portfolio and distributes the proceeds to the owner. The resulting proceeds to the user vary based on the asset performance and associated spending level of the portfolio. In addition, when the portfolio crosses a risk level, the system may automatically reallocate assets in the portfolio to a mix of assets consistent with the desired portfolio results.

In another embodiment, an investor could elect to target a certain level of ending assets, herein called a bequest or legacy goal, such that the total portfolio value is not exhausted entirely but rather decumulated to a specific goal. For example, an investor with $1 mm and a 20 year objective could target a $100,000 legacy goal. In this scenario, spending levels and risk levels would be adjusted over time to target $100,000 ending assets 20 years forward.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for managing asset decumulation in a portfolio performed by a decumulation management system, the method comprising:
   establishing, by the decumulation management system executing on a processor, a plurality of spending levels for decumulation of the portfolio over a decumulation period of time, the portfolio including a portfolio value invested in assets, the plurality of spending levels including sequentially increasing spending amounts indicating different constant values to be withdrawn from the portfolio at designated times during the decumulation period of time, wherein establishing the plurality of spending levels further comprises:
     receiving, using a user interface of the decumulation management system, a lowest spending amount withdrawable from the portfolio and a highest spending amount withdrawable from the portfolio; and
     determining the plurality of spending levels, each spending level of the plurality of spending levels corresponding to a portion of the portfolio between a first portion of the portfolio and a second portion of the portfolio;
   generating, using the processor, a plurality of spending bands for the plurality of spending levels, one spending band for one spending level, wherein each spending band is generated by calculating a probability of successfully withdrawing a spending amount corresponding to a corresponding spending level from the portfolio for a duration of the decumulation period of time and without exceeding the portfolio value prior to an end of the decumulation period of time;
   generating, using the processor, a lower probability threshold and an upper probability threshold for each spending band over a plurality points in time, the lower probability threshold indicating a payout reduction by moving to a spending level having a lower spending amount, and the upper probability threshold indicating a payout increase by moving to a spending level having a higher spending amount;

generating, using iterative simulations, funded ratio bands from the lower probability threshold and the upper probability threshold of the each spending level, the funded ratio bands measuring a ratio of assets in the portfolio to liabilities;

converting the funded ratio bands to corresponding non-overlapping asset bands;

displaying, on a display screen, the plurality of spending bends overlaid with the non-overlapping asset bands on a graphical interface of the decumulation management system;

selecting, by the processor, a current spending amount from one of the established plurality of spending levels based on an initial portfolio value; and simulating, using the decumulation management system, a decumulation of the portfolio over the duration of the decumulation period of time by:

monitoring, by the processor, the portfolio value during the decumulation of the portfolio as the current spending amount is withdrawn from the portfolio at designated times by automatically selling a portion of assets in the portfolio, for one or more points in time of the plurality of points in time during which the portfolio value falls below a threshold portfolio value of an asset band that corresponds to the current spending amount; and for each point in time in the one or more points in time, automatically reducing, by the processor, the current spending amount to a lower spending amount that corresponds to a lower spending level from the established plurality of spending levels, wherein the lower spending amount withdrawn at the designated times does not exceed the portfolio value during a remaining decumulation period of time, wherein during the simulating, the current spending amount is overlaid over the plurality of spending bends and the non-overlapping asset bands to graphically illustrate in the graphical interface a trajectory of the decumulation of the portfolio over a decumulation period of time.

2. The computer-implemented method of claim 1, wherein the probability of successfully withdrawing the spending amount for the duration of the decumulation period of time and without exceeding the portfolio value prior to an end of the decumulation period of time is at least 60%.

3. The computer-implemented method of claim 1, wherein the simulating further comprises:

monitoring the portfolio value during the decumulation of the portfolio as the current spending amount is withdrawn from the portfolio at the designated times, for one or more second points in time of the plurality of points in time during which the portfolio value is above an upper threshold portfolio value of the asset band that includes the current spending amount; and for each second point in time in the one or more second points in time, automatically increasing, by the processor, the spending amount from the current spending amount to a higher spending amount that corresponds to a higher spending level from the established plurality of spending levels, the higher spending amount associated with a higher asset band, wherein the higher spending amount withdrawn at the designated times does not exceed the portfolio value during the remaining decumulation period of time.

4. The computer-implemented method of claim 3, wherein the probability of successfully withdrawing the spending amount that is greater than the upper threshold portfolio value and without exceeding the portfolio value prior to the remaining decumulation time period is 97%.

5. The computer-implemented method of claim 1, wherein the probability of successfully withdrawing the spending amount is determined based on iterative Monte-Carlo simulations.

6. The computer-implemented method of claim 1, wherein the liabilities in the portfolio measure a present value of future spending.

7. The computer-implemented method of claim 1, further comprising, at a point in time of the plurality of points in time, maintaining the current spending amount responsive to the value of the portfolio being less than the initial value of the portfolio and greater than the threshold portfolio value associated with the asset band for the current spending amount at the point in time.

8. The computer-implemented method of claim 1, wherein the plurality of points in time are during the decumulation period of time.

9. The computer-implemented method of claim 1, wherein the plurality of spending amounts are established before the decumulation period of time.

10. The computer-implemented method of claim 1, wherein the probability of successfully withdrawing the current spending amount for the duration of the decumulation period of time and without exceeding the portfolio value prior to an end of the decumulation period of time is at most 60%.

11. The computer-implemented method of claim 1, further comprising:

determining risk bands associated with the portfolio, wherein each risk band in the risk bands is associated with a basket of assets different from other risk bands, the basket of assets targets volatility of the portfolio.

12. The computer-implemented method of claim 11, further comprising:

determining a minimum risk band and a maximum risk band in the risk bands using Monte-Caro simulation; and determining intermediate risk bands by interpolating from the minimum risk band to the maximum risk band.

13. The computer-implemented method of claim 1, further comprising:

receiving, using a second user interface of the decumulation management system, a desired payout amount, the portfolio value, and a decumulation time period, and generating a result of the simulation as a single graph in the graphical interface, the single graph illustrating a relationship among the payout amount, the plurality of spending levels, the portfolio value and the asset bands over the decumulation time period.

14. The computer-implemented method of claim 13, further comprising:

receiving, using the second user interface, a second desired payout amount, different from the desired payout amount;

performing a second simulation of the decumulation of the portfolio over the duration of the decumulation period and with the second desired payout amount as the current spending amount; and regenerating the single graph with a result of the second simulation.

15. A computer-implemented method for managing asset decumulation in a portfolio, the method comprising:
  establishing, by a decumulation management system implemented on a processor, a spending amount for decumulation of the portfolio over a decumulation period of time, the portfolio including a portfolio value, the spending amount indicating an amount withdrawn from the portfolio value at designated times during the decumulating period of time, wherein establishing the spending amount further comprises:
    determining a first portion of the portfolio that corresponds to a lowest spending amount and a second portion of the portfolio that corresponds to a highest spending amount;
    determining a plurality of spending levels, each spending level being a portion of the portfolio between the first portion of the portfolio and the second portion of the portfolio, and the each spending level corresponding to a spending amount greater than a preceding spending level; and
    selecting the spending amount from one of the plurality of spending levels based on an initial portfolio value;
  generating, using the processor, a plurality of spending bands for the plurality of spending levels, one spending band for one spending level, wherein each spending band is generated by calculating a probability of successfully withdrawing a spending amount corresponding to the spending level from the portfolio for a duration of the decumulation period of time and without exceeding the portfolio value prior to an end of the decumulation period of time;
  generating, using the processor, a lower probability threshold and an upper probability threshold for each spending band over a plurality points in time, the lower probability threshold indicating a payout reduction by moving to a spending level having a lower spending amount, and the upper probability threshold indicating a payout increase by moving to a spending level having a higher spending amount;
  generating funded ratio bands from the lower probability threshold and the upper probability threshold for the each spending level using iterative simulations, the funded ratio bands measuring a ratio of assets in the portfolio to liabilities;
  converting the funded ratio bands to corresponding asset bands;
  establishing a plurality of risk bands, wherein each risk band represents investment of the portfolio in a different mix of assets that target a volatility that corresponds to the risk band and has an assumed rate of return, where establishing the plurality of risk bands further comprises:
    determining a maximum risk band in the plurality of risk bands that corresponds to first asset values that meet a maximum volatility with a first preconfigured confidence;
    determining a minimum risk band in the plurality of risk bands that corresponds to a second asset values that meet a minimum volatility with a second preconfigured confidence; and
    determining remaining risk bands in the plurality of risk bands from the minimum risk band to the maximum risk band by interpolating between the minimum volatility with the second preconfigured confidence and the maximum volatility with the first preconfigured confidence and identifying a risk band for the remaining risk bands with a mix of assets that corresponds to a volatility and a preconfigured confidence at each interpolation;
  mapping the portfolio into the established plurality of risk bands over the decumulation period of time;
  displaying, on a graphical interface, the plurality of spending levels overlaying the asset bands and the portfolio mapped into the plurality of risk bands over the decumulation period of time; and
  simulating, using the decumulation management system, a decumulation of the portfolio over the duration of the decumulation period of time by:
    monitoring, by the processor, the portfolio value during the decumulation of the portfolio at the risk band of the established plurality of risk bands as the selected spending amount is withdrawn from the portfolio at the designated times by selling a portion of assets in the portfolio, until one or more points in time of the plurality of points in time where the portfolio value during decumulation time period of the portfolio is above a threshold portfolio value for the corresponding asset band; and
    for each point in time in the one or more points in time, automatically modifying, by the processor, the risk band to a lower risk band selected from the established plurality of risk bands, wherein the lower risk band has a different mix of assets than the risk band and corresponds to a lower volatility than the risk band and the automatically modifying further comprises automatically buying and selling assets in the portfolio to obtain the assets in the lower risk band, wherein during the simulating, the selected spending amount is overlaid over the plurality of spending levels, the asset bands and the portfolio mapped to plurality of risk bands, wherein a trajectory of the overlaid selected spending amount is a graphical representation of a portfolio performance over the decumulation period.

16. The computer-implemented method of claim 15, wherein the probability of withdrawing the spending amount for a duration of the decumulation period of time and without exceeding the portfolio value prior to the end of the decumulation period of time is 90%.

17. The computer-implemented method of claim 15, wherein the probability of successfully withdrawing the spending amount is determined based on iterative Monte-Carlo simulations.

18. The computer-implemented method of claim 15, wherein the liabilities in the portfolio measure a present value of future spending.

19. The computer-implemented method of claim 15, further comprising:
  maintaining the spending amount after modifying the risk band to the lower risk band.

20. The computer-implemented method of claim 15, further comprising:
  for one point in time in the one or more points in time, automatically modifying, by the processor, the risk band to a higher risk band selected from the established plurality of risk bands, wherein the lower risk band has a different mix of assets than the risk band and corresponds to a higher volatility than the risk band.

* * * * *

UNITED STATES PATENT AND TRADEMARK OFFICE
CERTIFICATE OF CORRECTION

PATENT NO. : 11,468,513 B2
APPLICATION NO. : 14/181620
DATED : October 11, 2022
INVENTOR(S) : Sunder Rajan Ramkumar, Michael John Fredericks and Michael Olegovich Pensky It is certified that error appears in the above-identified patent and that said Letters Patent is hereby corrected as shown below:

In the Claims

At Column 10, Line 44: Please replace "Monte-Caro" with "Monte Carlo"

Signed and Sealed this
Third Day of January, 2023

Katherine Kelly Vidal
*Director of the United States Patent and Trademark Office*